United States Patent
Takagi et al.

(10) Patent No.: US 11,853,947 B2
(45) Date of Patent: Dec. 26, 2023

(54) VEHICLE DISPATCHING SYSTEM, VEHICLE DISPATCHING METHOD, AND VEHICLE DISPATCHING DEVICE

(71) Applicants: Nissan Motor Co., Ltd., Kanagawa (JP); RENAULT S.A.S., Boulogne-Billancourt (FR)

(72) Inventors: Yoshitaka Takagi, Kanagawa (JP); Yutaka Mikuriya, Kanagawa (JP); Masahide Nakamura, Kanagawa (JP)

(73) Assignees: Nissan Motor Co., Ltd., Kanagawa (JP); Renault S.A.S., Boulogne-Billancourt (FR)

( * ) Notice: Subject to any disclaimer, the term of this patent is extended or adjusted under 35 U.S.C. 154(b) by 0 days.

(21) Appl. No.: 17/919,063

(22) PCT Filed: Apr. 17, 2020

(86) PCT No.: PCT/IB2020/000383
§ 371 (c)(1),
(2) Date: Oct. 14, 2022

(87) PCT Pub. No.: WO2021/209782
PCT Pub. Date: Oct. 21, 2021

(65) Prior Publication Data
US 2023/0169430 A1 Jun. 1, 2023

(51) Int. Cl.
*G06Q 10/00* (2023.01)
*G06Q 50/00* (2012.01)
(Continued)

(52) U.S. Cl.
CPC ....... *G06Q 10/06315* (2013.01); *G06Q 10/02* (2013.01); *G06Q 50/30* (2013.01); *G08G 1/202* (2013.01)

(58) Field of Classification Search
CPC .............................. G08G 1/202; G06Q 50/30
See application file for complete search history.

(56) References Cited

U.S. PATENT DOCUMENTS

2012/0232943 A1 9/2012 Myr
2018/0211541 A1* 7/2018 Rakah .................. G08G 1/148
(Continued)

FOREIGN PATENT DOCUMENTS

JP 2003-099891 A 4/2003
JP 2006/252065 A 9/2006
(Continued)

OTHER PUBLICATIONS

J. Kamau, A. Ahmed, A. Rebeiro-H, H. Kitaoka, H. Okajima and Z. H. Ripon, "Demand Responsive Mobility as a Service," 2016 IEEE International Conference on Systems, Man, and Cybernetics (SMC), Budapest, Hungary, 2016, pp. 001741-001746, doi: 10.1109/SMC. 2016.7844489. (Year: 2016).*

*Primary Examiner* — Matheus Ribeiro Stivaletti
(74) *Attorney, Agent, or Firm* — Osha Bergman Watanabe & Burton LLP

(57) ABSTRACT

A vehicle dispatching method is provided for managing a dispatch to a user of a first vehicle reserved by a user as a dispatch vehicle or a second vehicle that can be dispatched to a scheduled boarding point in which the user boards the dispatch vehicle, using a controller for communicating with communication devices in the first vehicle and the second vehicle. The method includes: acquiring, before the user arrives at the plan boarding point, position information of the first vehicle and position information of the second vehicle; calculating a first scheduled arrival period until the first vehicle arrives at the scheduled boarding point based on the acquired position information of the first vehicle; calculating a first waiting period difference between a user scheduled arrival period until the user arrives at the sched- (Continued)

uled boarding point and the first scheduled arrival period; calculating a second scheduled arrival period until the second vehicle arrives at the scheduled boarding point for the user based on the acquired position information of the second vehicle; calculating a second waiting period difference between the user scheduled arrival period and the second scheduled arrival period; determining whether or not the second waiting period is shorter than the first waiting period; and when determining that the second waiting period is shorter than the first waiting period, designating the second vehicle as the dispatch vehicle.

16 Claims, 7 Drawing Sheets

(51) Int. Cl.
*G06Q 10/0631* (2023.01)
*G06Q 10/02* (2012.01)
*G06Q 50/30* (2012.01)
*G08G 1/00* (2006.01)

(56) References Cited

U.S. PATENT DOCUMENTS

| 2018/0314988 | A1 | 11/2018 | Harada | |
|---|---|---|---|---|
| 2019/0057476 | A1* | 2/2019 | Zhang | G07B 15/00 |
| 2020/0104965 | A1* | 4/2020 | Ramot | G06Q 30/0621 |
| 2020/0361503 | A1* | 11/2020 | Teshima | B61L 27/70 |
| 2021/0316628 | A1* | 10/2021 | Taguchi | G06Q 10/0631 |

FOREIGN PATENT DOCUMENTS

| JP | 2018-060372 A | 4/2018 |
|---|---|---|
| WO | 2017/081849 A1 | 5/2017 |

* cited by examiner

VEHICLE DISPATCHING SYSTEM, VEHICLE DISPATCHING METHOD, AND VEHICLE DISPATCHING DEVICE

TECHNICAL FIELD

The present invention relates to a vehicle dispatching system, a vehicle dispatching method, and a vehicle dispatching device.

BACKGROUND ART

There has been known a vehicle dispatch control device that, when notified from a terminal of a station where a pickup and drop-off service of a dispatch vehicle is available that a reservation holder has arrived at the station, compares scheduled arrival times of a reserved vehicle and an empty vehicle, and when the scheduled arrival time of the empty vehicle is earlier, dispatches the empty vehicle as a new reserved vehicle for the reservation holder to the station (Patent Document 1).

PRIOR ART DOCUMENT

Patent Document

[Patent Document 1] WO 2017/081849

SUMMARY OF INVENTION

Problems to be Solved by Invention

However, with Patent Document 1, since control for dispatching the empty vehicle as the new reserved vehicle is executed after a user as the reservation holder arrives at the station, there is a problem as below. For example, when an empty vehicle arrives at the station before the user arrives at the station, there is a problem that the empty vehicle is dispatched to another user even though a period difference between an arrival period of the empty vehicle and a scheduled arrival period of the user is shorter than a period difference between the scheduled arrival period of the user and a scheduled arrival period of a reserved vehicle, and a period for the user to wait for the dispatch vehicle becomes long.

An object of the present invention is to provide a vehicle dispatching system, a vehicle dispatching method, and a vehicle dispatching device that allow shortening a waiting period of a dispatch vehicle or a user at a boarding point of the user.

Means for Solving Problems

The present invention to solve the above problems provides a vehicle dispatching system including a first vehicle reserved by a user as a dispatch vehicle, a second vehicle that can be dispatched to a scheduled boarding point at which the user boards the dispatch vehicle, and a controller for communicating with the first vehicle and the second vehicle and for managing a dispatch of the first vehicle and the second vehicle to the user. The controller is configured to calculate, before the user arrives at the scheduled boarding point, respective scheduled arrival periods until the first vehicle, the second vehicle, and the user arrive at the scheduled boarding point, calculate a first waiting period difference between the scheduled arrival periods of the first vehicle and the user, calculate a second waiting period difference between the scheduled arrival periods of the second vehicle and the user, determine whether or not the second waiting period is shorter than the first waiting period, and when determining that the second waiting period is shorter than the first waiting period, designate the second vehicle as the dispatch vehicle.

Effect of Invention

With the present invention, the waiting period of the dispatch vehicle or the user at the boarding point of the user can be shortened.

MODE(S) FOR CARRYING OUT THE INVENTION

First Embodiment

The following describes embodiments of the present invention based on the drawings. The present invention is an invention applied to a vehicle dispatching system, and the vehicle dispatching system has a vehicle dispatching device for communicating with a plurality of vehicles and a terminal device of a user. When a user makes a vehicle dispatch reservation via the terminal device or the like, the vehicle dispatching device designates a vehicle to be dispatched to the user and transmits information on dispatch designation to the vehicle and the terminal device of the user.

Figure 1:
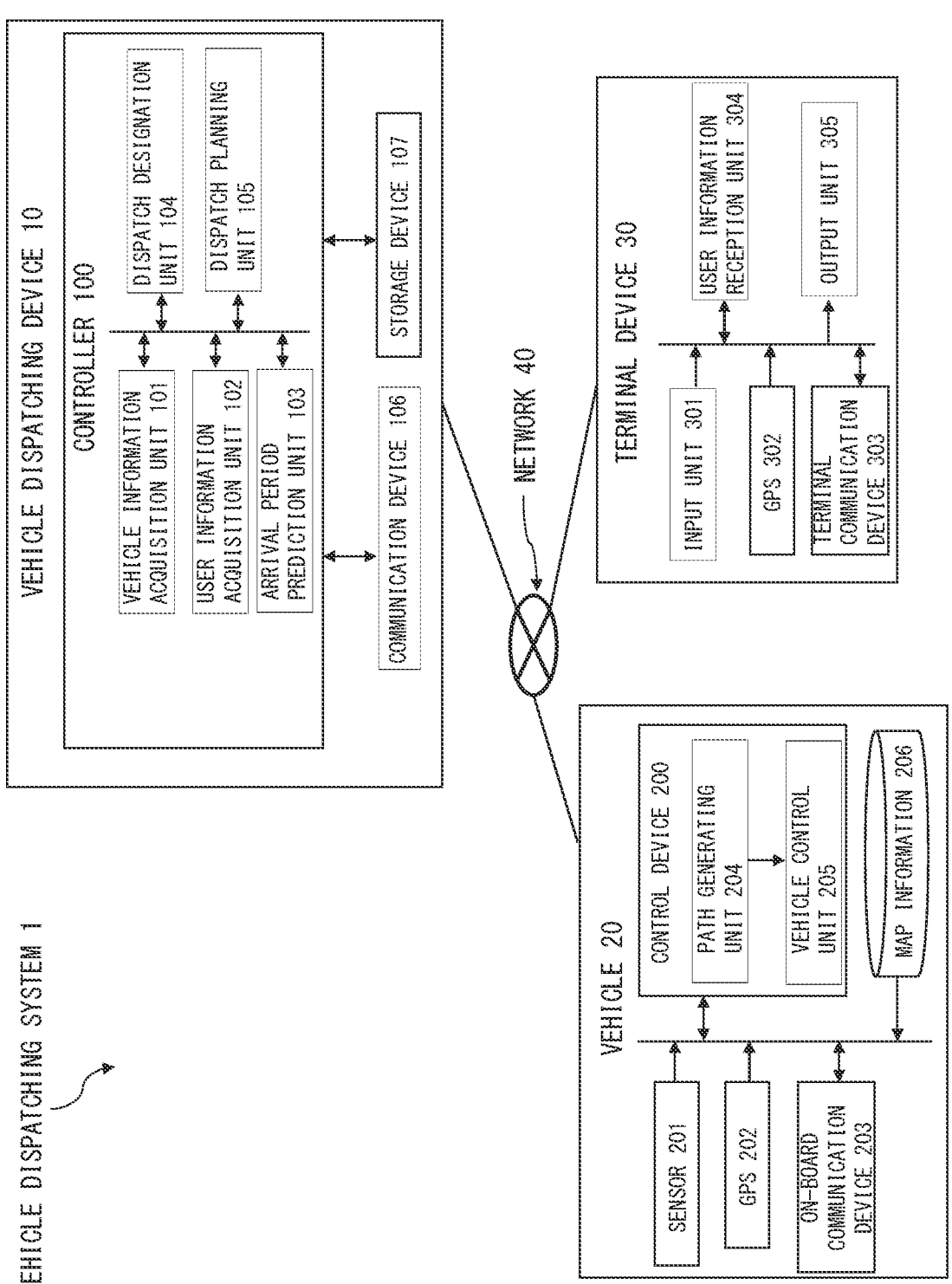
FIG. 1 is a block diagram illustrating one example of a vehicle dispatching system according to an embodiment.

FIG. 1 is a block diagram illustrating one example of a vehicle dispatching system 1 including a vehicle dispatching device 10 according to an embodiment of the present invention. The vehicle dispatching device 10 according to this embodiment is disposed outside a vehicle 20. For example, the vehicle dispatching device 10 is installed in a control center or the like of a business operator who provides a vehicle dispatch service. The vehicle dispatching system 1 includes the vehicle dispatching device 10, the vehicle 20, a terminal device 30, and a network 40 constituting an electric communication line network. The vehicle 20 is a vehicle managed by the vehicle dispatching system 1. While one vehicle 20 is illustrated in FIG. 1, the vehicle 20 includes a plurality of vehicles that have a similar configuration. A smartphone, a mobile phone, a portable computer, and the like can be used as the terminal device 30, which is used by a user who use the vehicle dispatch service. Similarly, the terminal device 30 includes a plurality of terminal devices that have a similar configuration. The vehicle dispatching device 10 is connected to a plurality of vehicles 20 and a plurality of terminal devices 30 via the network 40.

The vehicle dispatching device 10 is described. The vehicle dispatching device 10 includes a controller 100, a communication device 106, and a storage device 107. The controller 100 includes a vehicle information acquisition unit 101, a user information acquisition unit 102, an arrival period prediction unit 103, a dispatch designation unit 104, and a dispatch planning unit 105. The controller 100 is configured by a computer including hardware and software and is configured of a Read Only Memory (ROM) that stores a program, a Central Processing Unit (CPU) that executes the program stored in the ROM, and a Random Access Memory (RAM) that functions as an accessible storage device. As an operation circuit, instead of or together with the CPU, a Micro Processing Unit (MPU), a Digital Signal Processor (DSP), an Application Specific Integrated Circuit (ASIC), a Field Programmable Gate Array (FPGA), or the like can be used.

The vehicle information acquisition unit 101 acquires vehicle information from the vehicle 20 via the communication device 106. The vehicle information includes at least vehicle position information. As the vehicle 20, a first vehicle that is a vehicle designated as a dispatch vehicle when a user makes a vehicle dispatch reservation and a second vehicle that is a vehicle that can be dispatched to a scheduled boarding point at a scheduled boarding time when the user boards are included. In this embodiment, the vehicle that can be dispatched is defined as a vehicle that arrives at the scheduled boarding point within a predetermined period before and after the scheduled boarding time and becomes an empty vehicle, but is not limited to this. A vehicle that is traveling within a predetermined range from the scheduled boarding point in an empty vehicle state and a vehicle that arrives at another boarding/alighting point within the predetermined range from the scheduled boarding point within the predetermined period before and after the scheduled boarding time of the user and becomes an empty vehicle may be included. While details are described below, in this embodiment, a scheduled arrival period until the vehicle 20 arrives at the scheduled boarding point of the user is calculated using the acquired position information of the vehicle 20. However, a vehicle scheduled arrival period may be calculated in the vehicle 20. In that case, the vehicle information includes information of the vehicle scheduled arrival period.

The user information acquisition unit 102 acquires user information from the terminal device 30 operated by the user via the communication device 106. The user information includes user reservation information set by the user when making a vehicle dispatch reservation or position information of the user. The user reservation information includes information on a destination and a desired boarding time set by the user.

The arrival period prediction unit 103 calculates a first scheduled arrival period until the first vehicle arrives at the scheduled boarding point from a current position and a second scheduled arrival period until the second vehicle arrives at the scheduled boarding point from a current position. Specifically, first, from the position information of the first vehicle acquired by the vehicle information acquisition unit 101 and position information of the scheduled boarding point, the arrival period prediction unit 103 sets a traveling route from the current position of the first vehicle to the scheduled boarding point. Then, the arrival period prediction unit 103 calculates the first scheduled arrival period by calculating a required period for the first vehicle to travel along the traveling route. As setting of the traveling route, for example, the shortest path from the current position of the first vehicle to the scheduled boarding point is set as the traveling route. The required period to travel a distance of the traveling route is calculated by dividing the distance of the traveling route by a vehicle speed, for example, a legally permitted speed. Further, the arrival period prediction unit 103 acquires traffic information of Vehicle Information and Communication System (hereinafter referred to as VICS (registered trademark)) via the communication device 106, acquires traffic congestion information in the traveling route, and when traffic congestion happens, calculates the scheduled arrival period by adding a delay period due to the traffic congestion. The second scheduled arrival period of the second vehicle is calculated similarly to the first scheduled arrival period of the first vehicle. Note that the scheduled arrival periods of the first vehicle and the second vehicle may be calculated by the respective vehicles, not by the vehicle dispatching device 10. In that case, the vehicle information acquisition unit 101 acquires the calculated scheduled arrival periods from the vehicle 20.

The arrival period prediction unit 103 sets a user scheduled arrival period until the user arrives at the scheduled boarding point from the user information acquired by the user information acquisition unit 102. For example, first, based on the position information of the user and the position information of the scheduled boarding point, a moving route from a current position of the user to the scheduled boarding point is set. In this embodiment, the user is assumed to move on foot, but may move by means other than on foot, such as by bicycle, without being limited to this. Then, the user scheduled arrival period is set by calculating a required period to move for a distance of the moving route. As setting of the moving route, for example, the shortest path from the current position of the user to the scheduled boarding point is set as the moving route. The required period to move for the distance of the moving route is calculated by dividing the distance of the moving route by a moving speed, for example, a speed set as a general walking speed. The user scheduled arrival period may be set based on the desired boarding time set by the user when making a reservation. The user scheduled arrival period may be calculated by the terminal device 30, not by the vehicle dispatching device 10. In that case, the user information acquisition unit 102 acquires the calculated scheduled arrival period from the terminal device 30.

Next, the arrival period prediction unit 103 calculates an absolute value of a period difference between the user scheduled arrival period and the first scheduled arrival period and sets the calculated absolute value of the period difference as a first waiting period. Similarly, an absolute value of a period difference between the user scheduled arrival period and the second scheduled arrival period is calculated, and the calculated absolute value of the period difference is set as a second waiting period. When the first waiting period and the second waiting period are calculated, information on the first waiting period and the second waiting period is output to the dispatch designation unit 104.

The dispatch designation unit 104 designates the vehicle 20 to be dispatched to the user. The dispatch designation unit 104 executes the dispatch designation in the following two situations. One situation is when the user makes a vehicle dispatch reservation. A vehicle designated as being dispatched at this time becomes the first vehicle. The other situation is after the first vehicle to be dispatched to the user is designated and before the user arrives at the scheduled boarding point. A vehicle designated as being dispatched at this time becomes the second vehicle, which is a substitute vehicle for the first vehicle. The dispatch designation unit 104 specifies a boarding/alighting point located within a predetermined range from the current position of the user based on the position information of the user when the user makes a vehicle dispatch reservation and sets the boarding/alighting point to be the scheduled boarding point. Then, a vehicle that can be dispatched to the scheduled boarding point is specified and designated as the dispatch vehicle to the user. For example, a vehicle located within a predetermined range of the scheduled boarding point is designated as the dispatch vehicle to the user.

The dispatch designation unit 104 compares the first waiting period and the second waiting period calculated by the arrival period prediction unit 103 before the user arrives at the scheduled boarding point after the first vehicle is designated as being dispatched, and when the second waiting period can be determined to be shorter than the first waiting period, designates the second vehicle to be dispatched to the user.

In this embodiment, as the second vehicle, a plurality of vehicles 20 may be detected. In that case, the second vehicle to be dispatched to the user is specified from among the detected plurality of second vehicles. For example, the arrival period prediction unit 103 calculates each period difference between the second waiting period calculated for each of the plurality of second vehicles and the first waiting period. Then, the dispatch designation unit 104 compares the respective calculated period differences and designates the second vehicle with a smaller period difference as the dispatch vehicle in preference to the second vehicles with larger period differences.

Further, as a method of specifying the second vehicle to be dispatched to the user from among the detected plurality of second vehicles, the arrival period prediction unit 103 calculates a scheduled arrival time at which the user arrives at the scheduled boarding point and scheduled arrival times at which the second vehicles arrive at the scheduled boarding point from the respective scheduled arrival periods. Then, the dispatch designation unit 104 compares the scheduled arrival time of the user with the respective scheduled arrival times of the plurality of second vehicles. When the second vehicles that arrive at or about the scheduled arrival time of the user exist, the second vehicle having a scheduled arrival time later than the scheduled arrival time of the user may be designated as the dispatch vehicle in preference.

Further, as a method of specifying the second vehicle to be dispatched to the user from among the detected plurality of second vehicles, the dispatch designation unit 104 sets respective traveling routes from current positions of the plurality of second vehicles to the scheduled boarding point and calculates respective distances of the traveling routes. Then, the calculated respective traveling route distances are compared, and the second vehicle with a smaller traveling route distance may be designated as the dispatch vehicle in preference to the second vehicles with larger traveling route distances. Additionally, a plurality of methods among the above-described methods of specifying the second vehicle to be dispatched to the user from among the plurality of second vehicles may be combined for specifying, or one method may be used for specifying. For example, when a plurality of methods are combined, the second vehicles having the scheduled arrival times later than the scheduled arrival time of the user are specified, and furthermore, among the specified second vehicles, the second vehicle with the smallest traveling route distance may be specified as the dispatch vehicle.

When the dispatch vehicle to the user is designated, the dispatch designation unit 104 determines whether or not an energy remaining amount of the second vehicle is larger than an energy necessary amount to travel to the destination of the user. The dispatch designation unit 104 designates the second vehicle as the dispatch vehicle when the energy remaining amount is determined to be larger and prohibits designating the second vehicle as the dispatch vehicle when the energy remaining amount is not determined to be larger. Specifically, first, the dispatch designation unit 104 acquires information on the energy remaining amount as the vehicle information of the second vehicle from the second vehicle via the communication device 106. Next, from the position information of the destination of the user, the traveling route to the destination is set, and the energy necessary amount to travel along the traveling route is calculated. Then, the energy remaining amount and the energy necessary amount to travel to the destination are compared. When the energy remaining amount is determined to be larger than the energy necessary amount to travel to the destination, the second vehicle is designated as the dispatch vehicle to the user. When the energy remaining amount is not determined to be larger, designating the second vehicle as the dispatch vehicle to the user is prohibited. When designating the second vehicle as the dispatch vehicle to the user is prohibited, the designation of the first vehicle as the dispatch vehicle to the user is maintained.

The dispatch planning unit 105 sets a traveling route along which the vehicle 20, which the dispatch designation unit 104 designates as being dispatched, travels. Specifically, based on the position information of the vehicle 20 designated as being dispatched and the position information of the scheduled boarding point, the traveling route from the current position of the vehicle 20 to the scheduled boarding point at which the user boards and the traveling route from the scheduled boarding point to the destination set by the user are set. When the traveling routes are set, information on the traveling routes are transmitted to the vehicle 20 via the communication device 106. The information on the set traveling routes may be stored in the storage device 107 together with the vehicle information specifying a target vehicle 20 as dispatch planning information. That is, the storage device 107 is controlled to store which vehicle 20 has a dispatch plan for traveling along which traveling route.

The dispatch planning unit 105 may replace the dispatch plan of the second vehicle that the dispatch designation unit 104 designates as being dispatched with the dispatch plan of the first vehicle. In this embodiment, for the dispatch plan, in response to a vehicle dispatch reservation of one user, the vehicle 20 accepts a sequence of travel in which the vehicle 20 moves from the vehicle current position to the scheduled boarding point of the user and moves from the scheduled boarding point to an alighting point that is the destination of the user as one dispatch plan. At this time, the dispatch planning unit 105 that sets the dispatch plan controls the storage device 107 to store information on the set dispatch plan. The information on the dispatch plan includes information on the user who makes the reservation, position information on the scheduled boarding point and the destination, and travel schedule information on which point to travel at which time. Furthermore, for the dispatch plan, in response to vehicle dispatch reservations of a plurality of users, a sequence of travel in which, from the vehicle current position, the respective users are allowed to board at the scheduled boarding points and to alight at the destinations in order may be accepted as one dispatch plan.

In this embodiment, a dispatch plan is assumed to be set for each vehicle, and the dispatch planning unit 105 may replace the dispatch plan of the second vehicle with the dispatch plan of the first vehicle. First, the dispatch planning unit 105 acquires the information on the dispatch plans of the first vehicle and the second vehicle from the storage device 107. Next, the dispatch planning unit 105 sets the dispatch plan set in the first vehicle to a dispatch plan of the second vehicle and sets the dispatch plan set in the second vehicle to a dispatch plan of the first vehicle. That is, first, as resetting of the dispatch plan of the second vehicle, based on the scheduled boarding point of the user set in the first vehicle, the traveling route from the current position of the second vehicle to the scheduled boarding point of the user is reset, and the reset traveling route and the traveling route from the scheduled boarding point of the user to the destination are set as the dispatch plan of the second vehicle. Next, as resetting of the dispatch plan of the first vehicle, based on the scheduled boarding point of another user set in the second vehicle, the traveling route from the current position of the first vehicle to the scheduled boarding point of the other user is reset, and the reset traveling route and the traveling route from the scheduled boarding point of the other user to the destination are set as the dispatch plan of the first vehicle.

The communication device 106 performs transmission and reception with an on-board communication device of the vehicle 20 via the network 40. The communication device 106 transmits the information on the dispatch designation and the information on the user to the on-board communication device of the vehicle 20 and receives the vehicle information including the position information of the vehicle 20 from the on-board communication device of the vehicle 20. The communication device 106 acquires road traffic information from VICS through information transmitting devices (beacons) disposed on roads, FM multiplex broadcasting, or the like. The road traffic information includes, for example, traffic congestion information by the lane, accident information, broken-down vehicle information, construction information, speed limit information, lane restriction information, and the like. The road traffic information does not necessarily include the respective pieces of information described above, and it is only necessary to include at least any one piece of information.

The storage device 107 stores various information required for control in the vehicle dispatching device 10. For example, map information required for generating the traveling route set by the dispatch planning unit 105 and information on the dispatch plan set for each vehicle 20 are stored.

Next, the vehicle 20 is described. The vehicle 20 is a vehicle capable of autonomous travel, and for example, an automobile that is equipped with a navigation device and automatically controls traveling control and that drives in an unmanned manner. The vehicle 20 includes a control device 200, a sensor 201, a GPS 202, an on-board communication device 203, and map information 206. The control device 200 includes a path generating unit 204 and a vehicle control unit 205.

The sensor 201 detects information on a traveling environment including existence of obstacles around the vehicle 20. The sensor 201 includes a camera. For example, the camera is a CCD camera, a CMOS camera, or an HD camera, takes images of objects ahead of and around the vehicle 20, and outputs the images as image data. The camera continues to shoot a state around the vehicle 20 and acquires taken images as a real-time video reflecting the state around the vehicle 20. Further, the camera is a device for recognizing environment information around an own vehicle and includes not only an image sensor but also an ultrasonic camera, an infrared camera, and the like. The sensor 201 includes a distance measuring sensor that measures distances to the objects that exist ahead of and around the vehicle 20. For example, various sensors, such as a laser range finder and an ultrasonic sensor, can be used.

Target objects that the sensor 201 detects include lane boundary lines, center lines, road markings, center dividers, guard rails, curbstones, expressway sidewalls, traffic signs, traffic lights, crosswalks, construction sites, accident scenes, and traffic restrictions. The target objects include automobiles (other vehicles) other than the own vehicle, motorcycles, bicycles, and pedestrians. The target objects include obstacles. The obstacles are target objects that influence travel of the own vehicle.

The GPS 202 is a GPS device that detects the current position of the vehicle 20. Position information of the own vehicle is acquired by receiving radio waves transmitted from a plurality of satellite communications by a receiver. Additionally, the GPS 202 can detect a change of the position information of the own vehicle by periodically receiving the radio waves transmitted from the plurality of satellite communications.

The on-board communication device 203 performs transmission and reception with the communication device 106 of the vehicle dispatching device 10 via the network 40. The on-board communication device 203 transmits the position information of the vehicle 20 to the communication device 106 of the vehicle dispatching device 10 and receives the information on the dispatch designation and the user information from the communication device 106 of the vehicle dispatching device 10.

The control device 200 acquires the information on the traveling environment around the vehicle from the sensor 201, the GPS 202, and the map information 206, acquires the information on the traveling route set by the vehicle dispatching device 10 via the on-board communication device 203, and generates a traveling path based on these acquired pieces of information. Then, the control device 200 controls the travel of the own vehicle along the generated traveling path.

The path generating unit 204 generates the traveling path along which the vehicle 20 travels based on the information on the traveling environment around the vehicle acquired from the sensor 201, the GPS 202, and the map information 206 and the traveling route acquired by the on-board communication device 203 from the vehicle dispatching device 10.

The vehicle control unit 205 controls the travel of the vehicle 20 in accordance with a surrounding condition of the vehicle 20 while complying with traffic regulations, along the traveling path generated by the path generating unit 204 using various information input from the sensor 201 and the GPS 202. Examples of specific control contents include brake operation, direction indicator operation, accelerator operation, steering operation, shift lever operation, and the like. Functions of automatic driving that the vehicle control unit 205 includes are not particularly limited, and techniques as of the filing of the subject application can be appropriately used. Examples of the vehicle control unit 205 include a unit that controls using an electronic circuit, such as an Electronic Control Unit (ECU).

The map information 206 includes road information and traffic regulation information. The road information and the traffic regulation information are defined by nodes and links (in other words, road links) connecting between the nodes. The links are identified at a lane level. The road information is information on roads along which a vehicle can travel. For example, any information on a road including a road type, a road width, a road shape, a road curvature, possibility of traveling in a straight line, priority relation of proceeding, possibility of overtaking (possibility of entry to adjacent lanes), and possibility of changing lanes is associated with each road link. However, information associated with the road link is not limited to this. Besides, for example, any information on intersections including installation positions of traffic lights, positions of the intersections, entering directions of the intersections, and types of the intersections is associated with each road link. The map information 206 may be high-accuracy map information appropriate to the automatic driving. The high-accuracy map information is acquired, for example, by communication with a server or a system disposed outside the own vehicle. The high-accuracy map information may be generated as needed based on information (for example, information on an object detected by a radar and images around the own vehicle taken by the camera) acquired in real time using the sensor 201.

Next, the terminal device 30 is described. The terminal device 30 includes at least an input unit 301, a GPS 302, a terminal communication device 303, a user information reception unit 304, and an output unit 305.

The input unit 301 accepts an input of the user reservation information.

The GPS 302 is a GPS device that detects the current position of the user. Position information of the terminal device 30, that is, the position information of the user is acquired by receiving radio waves transmitted from a plurality of satellite communications by a receiver. Additionally, the GPS 302 can detect a change of the position information of the user by periodically receiving the radio waves transmitted from the plurality of satellite communications.

The terminal communication device 303 receives various information and signals transmitted from the communication device 106 and transmits various information and signals to the communication device 106. For example, in this embodiment, the terminal communication device 303 receives the information on the vehicle designated as being dispatched and the information on the scheduled boarding point from the communication device 106 and transmits the information on the destination set by the user and the information on the desired boarding time to the communication device 106.

The user information reception unit 304 acquires the user reservation information input in the input unit 301 and current position information of the terminal device 30 detected by the GPS 302. Then, these pieces of information are output as the user information to the terminal communication device 303, together with a vehicle dispatch request signal.

The output unit 305 has a display screen and displays various information to the user. For example, the information on the scheduled boarding point received by the terminal communication device 303 and the information on the vehicle designated as being dispatched are displayed to the user.

Figure 2:
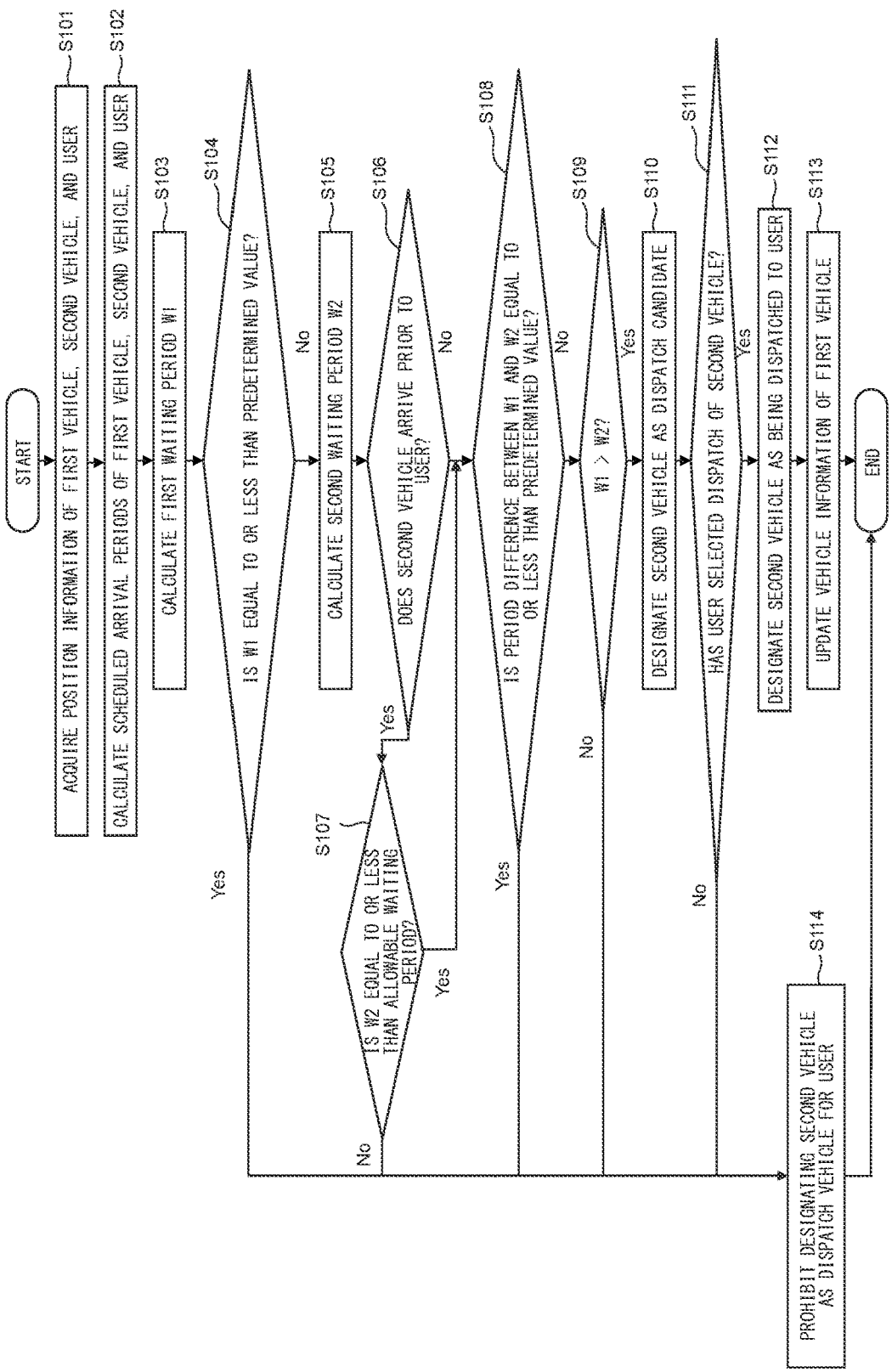
FIG. 2 is a flowchart illustrating a procedure of a vehicle dispatching method according to this embodiment.

Next, using a flowchart of FIG. 2, a procedure of executing control to designate a dispatch vehicle to be newly dispatched to a reservation holder who has already made a vehicle dispatch reservation is described. In the flowchart, the control according to this embodiment starts after a user makes a vehicle dispatch reservation and the dispatch designation unit 104 designates a dispatch vehicle to be dispatched to the user and before the user arrives at the scheduled boarding point. In the vehicle dispatch reservation by the user, when the user inputs the information on the desired boarding time and the destination via the terminal device 30 that can communicate with the vehicle dispatching device 10, these pieces of information are transmitted to the vehicle dispatching device 10 as the user reservation information. The user reservation information includes position information on the current position of the user when the user makes the reservation. Then, when the dispatch designation unit 104 of the vehicle dispatching device 10 acquires the user reservation information transmitted from the terminal device 30 via the communication device 106, the dispatch designation unit 104 designates the vehicle to be dispatched to the user. Specifically, the dispatch designation unit 104 sets the boarding/alighting point located within a predetermined range from the current position of the user as the scheduled boarding point of the user, specifies the vehicles 20 located in a predetermined range from the scheduled boarding point, and designates a vehicle that can be dispatched to the scheduled boarding point as the dispatch vehicle from among the specified vehicles 20. The vehicle designated as being dispatched at the time of the user reservation is referred to as the first vehicle. When the first vehicle is designated as the dispatch vehicle, the dispatch planning unit 105 sets the traveling route from the current position of the first vehicle to the scheduled boarding point and transmits the information on the traveling route to the first vehicle via the communication device 106. Then, for example, when there is a possibility that traffic congestion occurs in the set traveling route of the first vehicle and a delay of a predetermined period or more occurs, the dispatch designation unit 104 starts the flowchart from Step S101. In this case, for example, the dispatch designation unit 104 acquires the traffic information and determines whether or not there is traffic congestion information on the traveling route of the first vehicle, in a constant cycle. After the dispatch vehicle to the user is designated, the control according to the flowchart may be executed from Step S101 in a constant cycle.

In Step S101, the vehicle information acquisition unit 101 acquires the position information of the first vehicle, the second vehicle, and the user. Specifically, the vehicle information acquisition unit 101 acquires the position information of the first vehicle acquired by the GPS 202 of the first vehicle via the communication device 106. Further, as an acquiring method of the position information of the second vehicle, first, position information of a plurality of vehicles 20 other than the first vehicle is acquired via the communication device 106 and based on the position information, a plurality of vehicles 20 located within a predetermined range from the scheduled boarding point are detected. Even the vehicles 20 currently located out of the predetermined range from the scheduled boarding point may be included and detected as long as the vehicles 20 arrive at the scheduled boarding point within a predetermined period before and after the user scheduled arrival time. Then, from among the detected plurality of vehicles 20, a vehicle that can be dispatched to the scheduled boarding point at the scheduled boarding time of the user is specified as the second vehicle. In this embodiment, the vehicle that can be dispatched is defined as a vehicle that arrives at the scheduled boarding point within a predetermined period before and after the scheduled boarding time and becomes an empty vehicle, but is not limited to this. A vehicle that is traveling within the predetermined range from the scheduled boarding point in an empty vehicle state and a vehicle that arrives at another boarding/alighting point within the predetermined range from the scheduled boarding point within the predetermined period before and after the scheduled boarding time of the user and becomes an empty vehicle may be included. Additionally, the vehicle that can be dispatched may be a vehicle that has a set dispatch plan but can be dispatched to the scheduled boarding point of the user. The vehicle that can be dispatched to the scheduled boarding point of the user may be a vehicle scheduled to stop at the scheduled boarding point of the user or may be a vehicle scheduled to stop at another boarding/alighting point within the predetermined range from the scheduled boarding point. As described above, the position information of the specified second vehicle is acquired. The user information acquisition unit 102 acquires the position information acquired by the GPS 302 of the terminal device 30 of the user via the communication device 106.

In Step S102, the arrival period prediction unit 103 calculates the respective scheduled arrival periods until the first vehicle, the second vehicle, and the user arrive at the scheduled boarding point. The arrival period prediction unit 103 sets a traveling path from the current position of the first vehicle to the scheduled boarding point from the position information of the first vehicle acquired by the vehicle information acquisition unit 101 and the position information of the scheduled boarding point. Then, the first scheduled arrival period until the first vehicle arrives at the scheduled boarding point is calculated by calculating a required period for the first vehicle to travel along the traveling path. At this time, the arrival period prediction unit 103 acquires the traffic information of VICS and the like via the communication device 106, and when traffic congestion information in the traveling path of the first vehicle is acquired, adds a delay period due to the traffic congestion. This allows calculating the scheduled arrival period of the first vehicle when a traffic situation is changed from the time of the user reservation based on the traffic situation after the change. The scheduled arrival period until the second vehicle arrives at the scheduled boarding point is calculated similarly to the scheduled arrival period of the first vehicle.

Furthermore, in Step S102, the arrival period prediction unit 103 sets a moving path from the current position of the user acquired by the user information acquisition unit 102 to the scheduled boarding point. Then, the user scheduled arrival period until the user arrives at the scheduled boarding point is calculated by calculating a required period for the user to move along the moving path. Further, without calculating using the position information of the user, the user scheduled arrival period may be set based on the desired boarding time input by the user when making the reservation.

In Step S103, the arrival period prediction unit 103 calculates an absolute value of a period difference between the scheduled arrival period of the first vehicle and the scheduled arrival period of the user calculated in Step S102 as a first waiting period W1.

In Step S104, the dispatch designation unit 104 determines whether or not the first waiting period W1 is equal to or less than a predetermined value. Accordingly, when the difference between the scheduled arrival period of the first vehicle that is dispatched at the time of the reservation and the scheduled arrival period of the user is small, that is, a period for the user to wait for the first vehicle at the scheduled boarding point or a period for the first vehicle to wait for the user at the scheduled boarding point is short, rather than executing control to make a change to the second vehicle, the designation of the first vehicle as the dispatch vehicle to the user is maintained. When the first waiting period W1 is determined to be equal to or less than the predetermined value, the procedure proceeds to Step S114. When the first waiting period W1 is not determined to be equal to or less than the predetermined value, the procedure proceeds to Step S105.

In Step S105, the arrival period prediction unit 103 calculates an absolute value of a period difference between the scheduled arrival period of the second vehicle and the scheduled arrival period of the user calculated in Step S102 as a second waiting period W2.

In Step S106, the dispatch designation unit 104 determines whether or not the second vehicle arrives prior to the user. Specifically, the dispatch designation unit 104 calculates a second scheduled arrival time that is a scheduled time at which the second vehicle arrives at the scheduled boarding point based on the second scheduled arrival period. Based on the user scheduled arrival period, the user scheduled arrival time that is a scheduled time at which the user arrives at the scheduled boarding point is calculated, and the second scheduled arrival time and the user scheduled arrival time are compared. Then, when the second scheduled arrival time is earlier than the user scheduled arrival time, the second vehicle is determined to arrive prior to the user. When the second vehicle is determined to arrive prior to the user, the procedure proceeds to Step S107. When the second vehicle is not determined to arrive prior to the user, the procedure proceeds to Step S108.

In Step S107, the dispatch designation unit 104 determines whether or not the second waiting period W2 is equal to or less than a predetermined allowable waiting period. At this time, as the predetermined allowable waiting period, a predetermined period for which a vehicle can park or stop is set. This allows the second vehicle to avoid waiting for the user by parking or stopping at the scheduled boarding point for long. When the second waiting period W2 is determined to be equal to or less than the predetermined allowable waiting period, the procedure proceeds to Step S108. When the second waiting period W2 is not determined to be equal to or less than the predetermined allowable waiting period, the procedure proceeds to Step S114.

In Step S108, the dispatch designation unit 104 determines whether or not a period difference between the first waiting period W1 and the second waiting period W2 is equal to or less than a predetermined value. Specifically, first, the dispatch designation unit 104 calculates an absolute value of the period difference between the first waiting period W1 and the second waiting period W2. Then, the dispatch designation unit 104 determines whether or not the calculated period difference is equal to or less than the predetermined value. For example, when the second vehicle, the user, and the first vehicle are scheduled to arrive at the scheduled boarding point in this order, the dispatch designation unit 104 determines whether or not the period difference between the second waiting period W2 (period for the second vehicle to wait for the user) and the first waiting period W1 (period for the user to wait for the first vehicle) is equal to or less than the predetermined value. Further, for example, when the user, the second vehicle, and the first vehicle are scheduled to arrive at the scheduled boarding point in this order, the dispatch designation unit 104 determines whether or not the period difference between the second waiting period W2 (period for the user to wait for the second vehicle) and the first waiting period W1 (period for the user to wait for the first vehicle) is equal to or less than the predetermined value. This is because, when the waiting period of the dispatch vehicle or the user is not shortened very much even if the dispatch vehicle is changed from the first vehicle to the second vehicle, maintaining the designation of the first vehicle as the dispatch vehicle to the user is prioritized over executing the control to make the change to the second vehicle. When the period difference between the first waiting period W1 and the second waiting period W2 is determined to be equal to or less than the predetermined value, the procedure proceeds to Step S114. When the period difference between the first waiting period W1 and the second waiting period W2 is determined not to be equal to or less than the predetermined value, the procedure proceeds to Step S109.

In Step S109, the dispatch designation unit 104 compares the first waiting period W1 with the second waiting period W2 and determines whether or not the second waiting period W2 is shorter than the first waiting period W1. When the second waiting period W2 is determined to be shorter than the first waiting period W1, the procedure proceeds to Step S110. When the second waiting period W2 is not determined to be shorter than the first waiting period W1, the procedure proceeds to Step S114.

In this embodiment, the control from the Step S101 to Step S109 is executed repeatedly to determine whether or not the second waiting period W2 is shorter than the first waiting period W1, in a constant cycle. Accordingly, for example, when a situation changes because the first vehicle is delayed due to traffic congestion or the user makes a side trip and is delayed, depending on the change in the situation, which of the first vehicle and the second vehicle should be dispatched can be determined.

In Step S110, the dispatch designation unit 104 designates the second vehicle for which the second waiting period W2 is determined to be shorter than the first waiting period W1 in Step S109 as a dispatch vehicle candidate. At this time, in a comparison determination in Step S109, when the second waiting periods W2 of a plurality of second vehicles are determined to be shorter than the first waiting period W1, a comparison is made among the plurality of second vehicles to designate the dispatch vehicle candidate. For example, based on the period difference between the first waiting period W1 and the second waiting period W2, the second vehicle having a short period difference may be designated as the dispatch vehicle candidate, the second vehicle having the scheduled arrival time later than the scheduled arrival time of the user may be designated as the dispatch vehicle, or the second vehicle with a small traveling distance to the destination may be designated as the dispatch vehicle. Additionally, the dispatch designation unit 104 determines whether or not the energy necessary amount to travel to the destination of the user remains in the second vehicle, and when the energy necessary amount is determined not to remain, prohibits designating the second vehicle as the dispatch vehicle.

In Step S111, the dispatch designation unit 104 determines whether or not the user has selected a dispatch of the second vehicle. Specifically, the dispatch designation unit 104 transmits information on the second vehicle that is the dispatch vehicle candidate designated in Step S110 to the terminal device 30 via the communication device 106. Then, the information is displayed on the output unit 305 of the terminal device 30, allowing the user to select whether or not to make a change from the first vehicle to the second vehicle. At this time, the scheduled arrival period of the first vehicle may be displayed together. When it is determined that the user has selected the dispatch of the second vehicle, the procedure proceeds to Step S112. When it is not determined that the user has selected the dispatch of the second vehicle, the procedure proceeds to Step S114.

In Step S112, the dispatch designation unit 104 designates the second vehicle as the dispatch vehicle to be dispatched to the user. Then, the dispatch designation unit 104 transmits dispatch designation information that the second vehicle is designated as the dispatch vehicle to the terminal device 30 of the user. When the second vehicle is designated as the dispatch vehicle by the dispatch designation unit 104, the dispatch planning unit 105 sets a traveling route for allowing the user to board at the scheduled boarding point and traveling to the destination and transmits the information on the traveling route to the second vehicle designated as being dispatched via the communication device 106. At this time, when the dispatch plans are set in the first vehicle and the second vehicle, the dispatch planning unit 105 may replace the dispatch plans of the first vehicle and the second vehicle by setting the dispatch plan set in the first vehicle to the dispatch plan of the second vehicle and setting the dispatch plan set in the second vehicle to the dispatch plan of the first vehicle. Then, in the second vehicle that has received the information on the traveling route, the control device 200 generates a traveling path according to the traveling route based on surrounding environment information acquired from the sensor 201 and the map information 206 and controls vehicle travel along the traveling path.

In Step S113, the dispatch designation unit 104 updates the vehicle information of the first vehicle to information indicative of being a vehicle that can be dispatched. Accordingly, the first vehicle is no longer the dispatch vehicle that is dispatched to the user and becomes a vehicle that can be dispatched to another user. When Step S113 is completed, the control ends.

In Step S114, the dispatch designation unit 104 prohibits designating the second vehicle as the dispatch vehicle to the user and maintains the designation of the first vehicle as the dispatch vehicle to the user. When the control of Step S114 is completed, the control ends.

The following describes replacement of the dispatch plans according to this embodiment while presenting specific scenes.

Example 1

Figure 3:
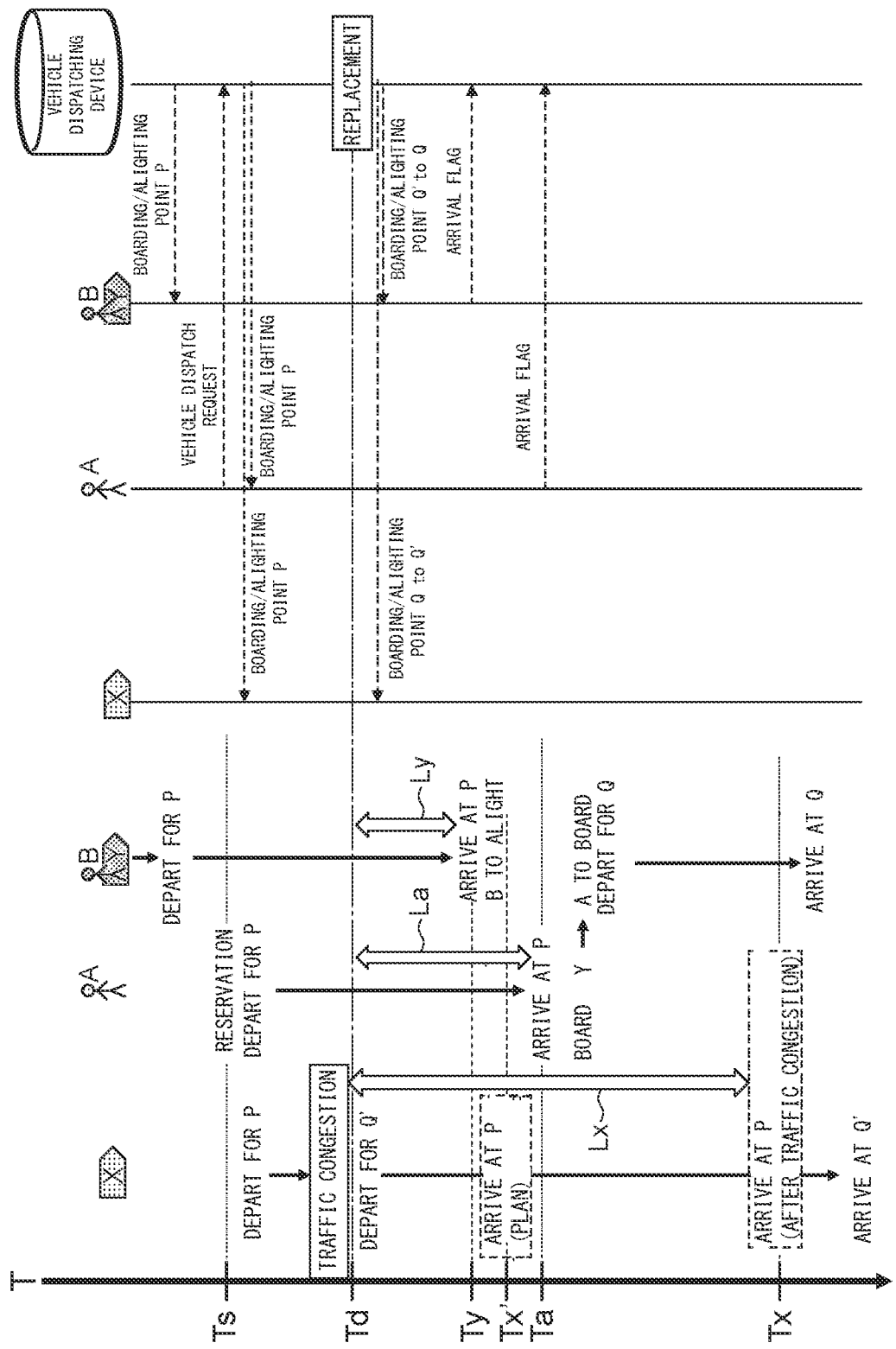
FIG. 3 is a drawing illustrating a working example when a second vehicle arrives at a scheduled boarding point prior to a user.

FIG. 3 illustrates an example 1 of this embodiment. In the example 1, first, a vehicle Y that is the second vehicle arrives at a boarding/alighting point P with a user B on board, then, a user A who is a reservation holder of a vehicle X as the first vehicle arrives at the boarding/alighting point P, and finally, the vehicle X arrives at the boarding/alighting point P. FIG. 3 is a drawing illustrating states of actions of the users and the vehicles along a time axis T and illustrates time schedules indicating the actions of the users and the vehicles along the time axis T and exchange of transmission and reception of mutual information executed in time with the actions of the users and the vehicles. In the time axis T, time passes toward an arrow direction.

In the example 1, first, when the user B makes a vehicle dispatch reservation by inputting the boarding/alighting point P as a destination, the dispatch designation unit 104 that receives information on the vehicle dispatch reservation designates the vehicle Y as the dispatch vehicle and sets a traveling path along which the vehicle Y allows the user B to board and travels to the boarding/alighting point P. The vehicle Y is controlled to travel along the traveling path and departs toward the boarding/alighting point P with the user B on board.

Next, at a time Ts, the user A makes a vehicle dispatch reservation by inputting a boarding/alighting point Q as a destination via the terminal device 30. When the dispatch designation unit 104 receives reservation information from the user A, the dispatch designation unit 104 designates the vehicle X as the dispatch vehicle and transmits information on the boarding/alighting point P that is appointed as a boarding point to the terminal device 30 of the user A. The user A who has confirmed the information on the boarding/alighting point P via the terminal device starts moving toward the boarding/alighting point P. When the vehicle X receives information on the designation of the dispatch vehicle and the information on the boarding/alighting point P, the vehicle X starts traveling toward the boarding/alighting point P.

In this embodiment, a procedure of acquiring position information of the user A, the vehicle X, and the vehicle Y, calculating a scheduled arrival period until each arrives at the boarding/alighting point P based on the information, and comparing a period difference between a scheduled arrival period La of the user A and a scheduled arrival period Lx of the vehicle X with a period difference between the scheduled arrival period La of the user A and a scheduled arrival period Ly of the vehicle Y is repeated, in a constant cycle. In this working example, the vehicle X was scheduled to arrive at the boarding/alighting point P at a time Tx' according to an original plan. However, at a time Td, since the vehicle X encounters traffic congestion on a traveling path, the arrival period prediction unit 103 acquires traffic congestion information on the traveling path of the vehicle X and calculates the scheduled arrival period Lx of the vehicle X by adding a delay period due to the traffic congestion. At this time, the user A is scheduled to arrive at a time Ta, and the vehicle Y is scheduled to arrive at a time Ty. The arrival period prediction unit 103 calculates the scheduled arrival period Ly until the vehicle Y arrives at the boarding/alighting point P and calculates the scheduled arrival period La until the user A arrives at the boarding/alighting point P. FIG. 3 is a drawing illustrating the time schedules when the scheduled arrival period of each of the vehicles and the users is calculated at the time Td. Accordingly, when the period difference between the scheduled arrival period La of the user A and the scheduled arrival period Lx of the vehicle X is determined to be larger than the period difference between the scheduled arrival period La of the user A and the scheduled arrival period Ly of the vehicle Y, the vehicle Y is designated as the dispatch vehicle to be dispatched to the user A. This is because a period for the vehicle Y to wait for arrival of the user at the boarding/alighting point P is shorter than a period for the user to wait for arrival of the vehicle X at the boarding/alighting point P. At this time, the dispatch planning unit 105 changes a destination of the vehicle Y from a boarding/alighting point Q' that is an original destination of the vehicle Y to the boarding/alighting point Q that is the destination of the user A and changes a destination of the vehicle X from the boarding/alighting point Q to the boarding/alighting point Q'.

Accordingly, after the vehicle Y arrives at the boarding/alighting point P, once the user B alights from the vehicle Y and the vehicle Y becomes an empty vehicle, the user A boards the vehicle Y after the user A arrives. Then, the vehicle Y with the user A on board starts traveling toward the destination Q after the change. Then, the vehicle X starts traveling toward the original destination Q' of the vehicle Y.

Example 2

Figure 4:
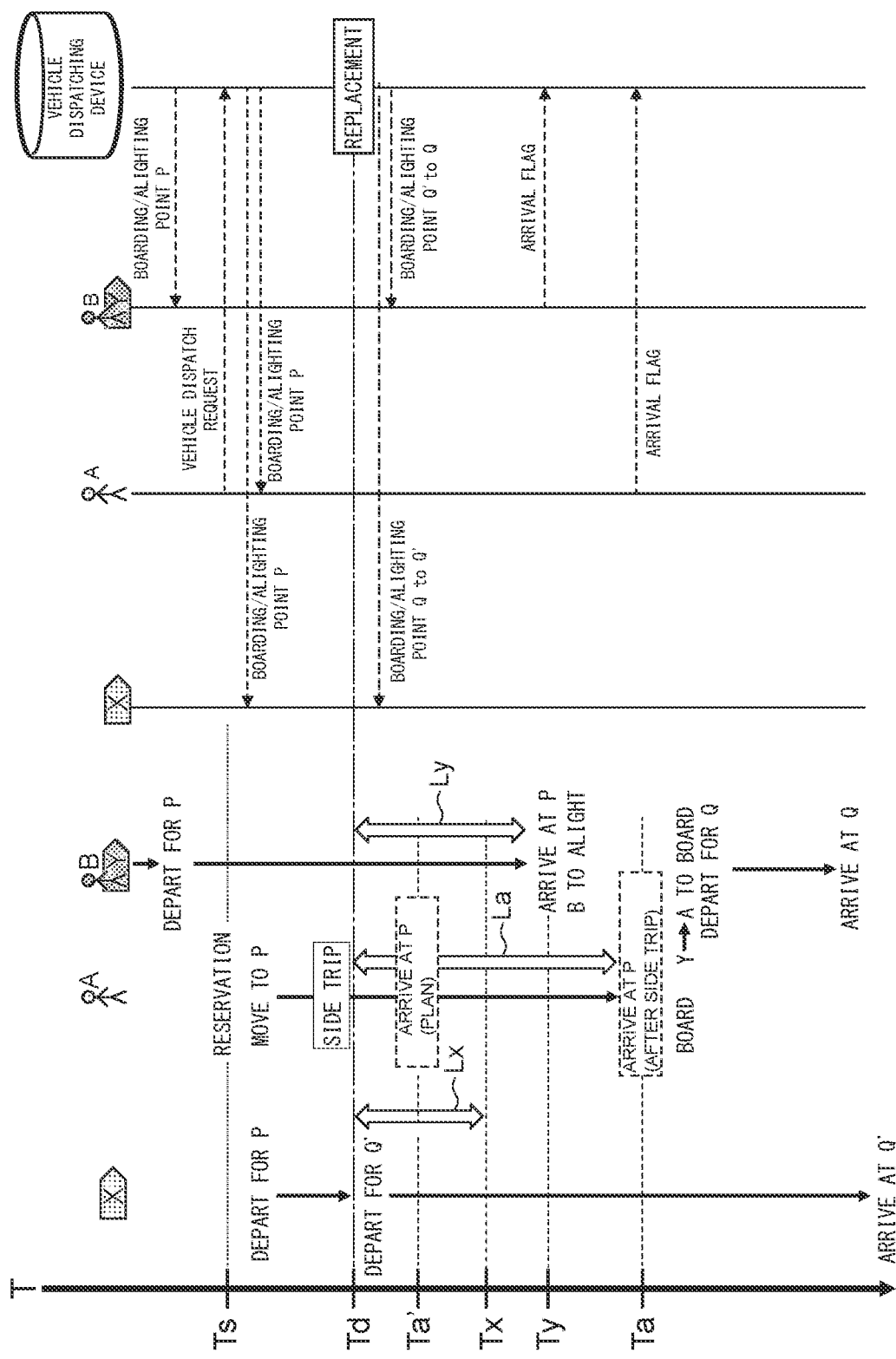
FIG. 4 is a drawing illustrating a working example when a first vehicle and the second vehicle arrive at the scheduled boarding point prior to the user.

Next, FIG. 4 is a drawing illustrating an example 2 of this embodiment. Different from the example 1 in which the vehicle X arrives later than the original plan due to the traffic congestion, the example 2 is an example in which the user A arrives later than an original plan by making a side trip and the like. In the example 2, first, after the vehicle X that is the first vehicle for which the user A has made a vehicle dispatch reservation to go to the destination Q arrives at the boarding/alighting point P, the vehicle Y that is the second vehicle with the user B on board arrives at the boarding/alighting point P, and finally, the user A arrives at the boarding/alighting point P. FIG. 4 is a drawing illustrating states of actions of the users and the vehicles along the time axis T and illustrates time schedules indicating the actions of the users and the vehicles along the time axis T and exchange of transmission and reception of information executed in time with the actions of the users and the vehicles. In the time axis T, time passes toward an arrow direction.

In the example 2, first, when the user B makes a vehicle dispatch reservation by inputting the boarding/alighting point P as a destination, the dispatch designation unit 104 that receives information on the vehicle dispatch reservation designates the vehicle Y as the dispatch vehicle and sets a traveling along which the vehicle Y allows the user B to board and travels to the boarding/alighting point P. The vehicle Y is controlled to travel along the traveling path and departs toward the boarding/alighting point P with the user B on board.

Next, at a time Ts, the user A makes a vehicle dispatch reservation by inputting the boarding/alighting point Q as a destination via the terminal device 30. When the dispatch designation unit 104 receives reservation information from the user A, the dispatch designation unit 104 designates the vehicle X as the dispatch vehicle and transmits information on the boarding/alighting point P that is appointed as a boarding point to the terminal device 30 of the user A. The user A who has confirmed the information on the boarding/alighting point P via the terminal device starts moving toward the boarding/alighting point P. When the vehicle X receives information on the designation of the dispatch vehicle and the information on the boarding/alighting point P, the vehicle X starts traveling toward the boarding/alighting point P.

In this embodiment, a procedure of acquiring the position information of the user A, the vehicle X, and the vehicle Y, calculating the scheduled arrival period until each arrives at the boarding/alighting point P based on the information, and comparing the period difference between the scheduled arrival period La of the user A and the scheduled arrival period Lx of the vehicle X with the period difference between the scheduled arrival period La of the user A and the scheduled arrival period Ly of the vehicle Y is repeated, in a constant cycle. In this working example, although the user A was scheduled to arrive at the boarding/alighting point P at a time Ta' according to an original plan, the scheduled arrival time changes to Ta (time later than the time Ta') because the user A makes a side trip at the time Td. That is, at the time Td, the arrival period prediction unit 103 calculates the scheduled arrival period La of the user A after making the side trip by adding a period it takes for the user A to make the side trip. At this time, the vehicle X is scheduled to arrive at a time Tx, and the vehicle Y is scheduled to arrive at the time Ty. The arrival period prediction unit 103 calculates the scheduled arrival period Lx until the vehicle X arrives at the boarding/alighting point P and calculates the scheduled arrival period Ly until the vehicle Y arrives at the boarding/alighting point P. For example, when the vehicle X has already arrived at the boarding/alighting point P, the scheduled arrival period Lx is calculated as zero. FIG. 4 is a drawing illustrating the time schedules when the scheduled arrival period of each of the vehicles and the users is calculated at the time Td. Accordingly, when the period difference between the scheduled arrival period La of the user A and the scheduled arrival period Lx of the vehicle X is determined to be larger than the period difference between the scheduled arrival period La of the user A and the scheduled arrival period Ly of the vehicle Y, the vehicle Y is designated as the dispatch vehicle to be dispatched to the user A. This is because a period for the vehicle Y to wait for the user A at the boarding/alighting point P is shorter than a period for the vehicle X to wait for the user A at the boarding/alighting point P. Then, the dispatch designation unit 104 changes the destination of the vehicle Y from the boarding/alighting point Q' to the boarding/alighting point Q and changes the destination of the vehicle X from the boarding/alighting point Q to the boarding/alighting point Q'.

Accordingly, before arriving at the boarding/alighting point P or without waiting for the user A after arriving, the vehicle X starts traveling toward the newly set boarding/alighting point Q'. After the vehicle Y arrives at the boarding/alighting point P, once the user B alights from the vehicle Y and the vehicle Y becomes an empty vehicle, the user A boards the vehicle Y after the user A arrives. Then, the vehicle Y with the user A on board starts traveling toward the destination Q after the change.

Example 3

Figure 5:
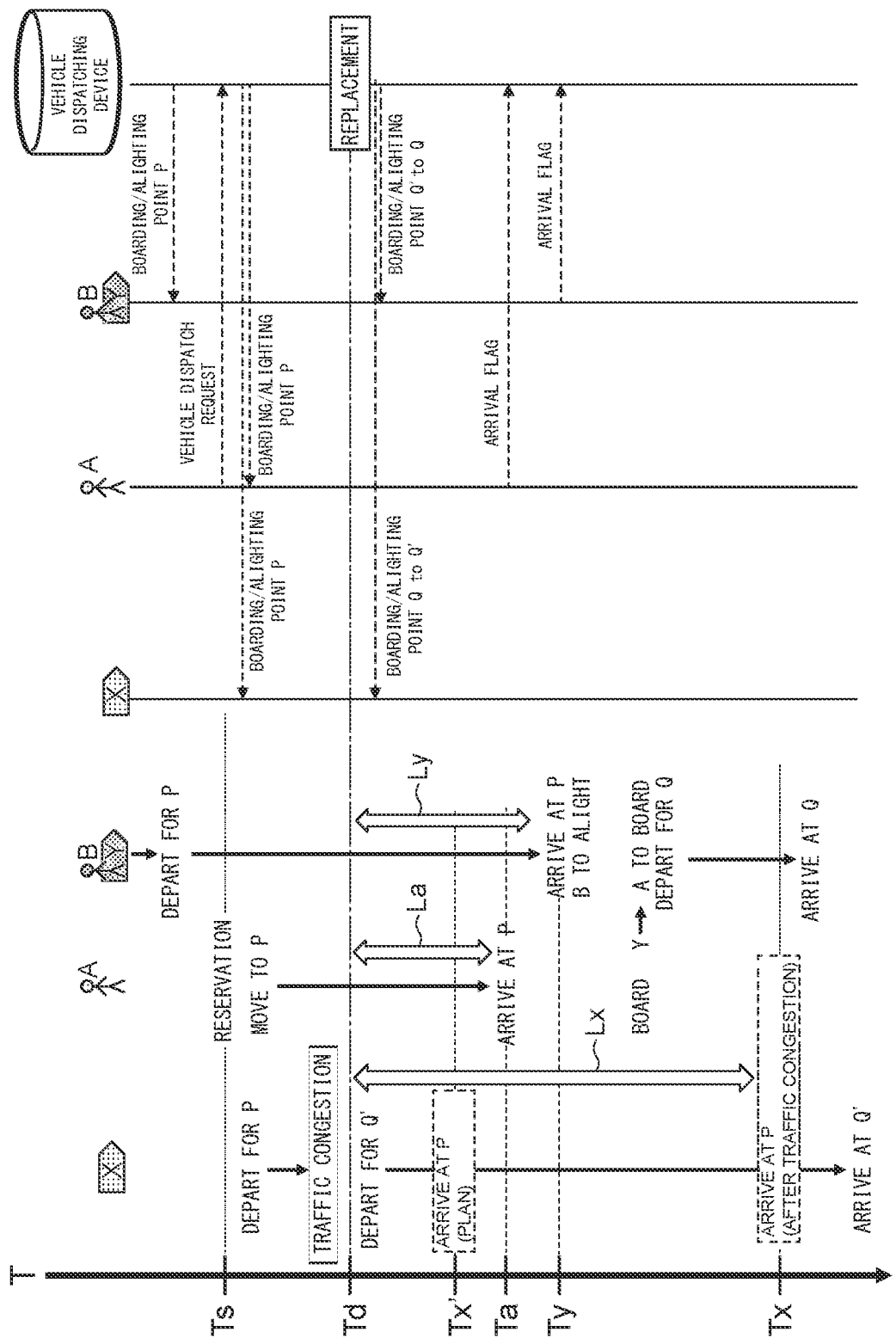
FIG. 5 is a drawing illustrating a working example when the user arrives at the scheduled boarding point prior to the first vehicle and the second vehicle.

Next, FIG. 5 is a drawing illustrating an example 3. The example 3 is, similarly to the example 1, an example in which the vehicle X arrives later than the original plan due to traffic congestion, but is different in that the user A arrives prior to the vehicle Y. In the example 3, first, after the user A arrives at the boarding/alighting point P, the vehicle Y arrives at the boarding/alighting point P with the user B on board, and finally, the vehicle X arrives at the boarding/alighting point P. FIG. 5 is a drawing illustrating states of actions of the users and the vehicles along the time axis T and illustrates time schedules indicating the actions of the users and the vehicles along the time axis T and exchange of transmission and reception of information executed in time with the actions of the users and the vehicles.

In the example 3, first, when the user B makes a vehicle dispatch reservation by inputting the boarding/alighting point P as a destination, the dispatch designation unit 104 that receives information on the vehicle dispatch reservation designates the vehicle Y as the dispatch vehicle and sets a traveling path along which the vehicle Y allows the user B to board and travels to the boarding/alighting point P. Then, the vehicle Y is controlled to travel along the traveling path and departs toward the boarding/alighting point P with the user B on board.

Next, at the time Ts, the user A makes a vehicle dispatch reservation by inputting the boarding/alighting point Q as a destination via the terminal device 30. When the dispatch designation unit 104 receives reservation information from the user A, the dispatch designation unit 104 designates the vehicle X as the dispatch vehicle and transmits information on the boarding/alighting point P that is appointed as a boarding point to the terminal device 30 of the user A. The user A who has confirmed the information on the boarding/alighting point P via the terminal device starts moving toward the boarding/alighting point P. When the vehicle X receives information on the designation of the dispatch vehicle and the information on the boarding/alighting point P, the vehicle X starts traveling toward the boarding/alighting point P.

In this embodiment, a procedure of acquiring the position information of the user A, the vehicle X, and the vehicle Y, calculating the scheduled arrival period until each arrives at the boarding/alighting point P based on the information, and comparing the period difference between the scheduled arrival period La of the user A and the scheduled arrival period Lx of the vehicle X with the period difference between the scheduled arrival period La of the user A and the scheduled arrival period Ly of the vehicle Y is repeated, in a constant cycle. In this working example, the vehicle X was scheduled to arrive at the boarding/alighting point P at the time Tx' according to an original plan. However, at the time Td, since the vehicle X encounters the traffic congestion on a traveling path, the plan is changed so as to be scheduled to arrive at the time Tx (time later than the time Tx'). That is, at the time Td, the arrival period prediction unit 103 acquires traffic congestion information on the traveling path of the vehicle X and calculates the scheduled arrival period Lx of the vehicle X by adding a delay period due to the traffic congestion. At this time, the user A is scheduled to arrive at the time Ta, and the vehicle Y is scheduled to arrive at the time Ty. The arrival period prediction unit 103 calculates the scheduled arrival period Ly until the vehicle Y arrives at the boarding/alighting point P and calculates the scheduled arrival period La until the user A arrives at the boarding/alighting point P. Accordingly, when the period difference between the scheduled arrival period La of the user A and the scheduled arrival period Lx of the vehicle X is determined to be larger than the period difference between the scheduled arrival period La of the user A and the scheduled arrival period Ly of the vehicle Y, the vehicle Y is designated as the dispatch vehicle to be dispatched to the user A. This is because a period for the user to wait for the vehicle Y at the boarding/alighting point P is shorter than a period to wait for the vehicle X. At this time, the dispatch designation unit 104 changes the destination of the vehicle Y from the boarding/alighting point Q' to the boarding/alighting point Q and changes the destination of the vehicle X from the boarding/alighting point Q to the boarding/alighting point Q'.

Accordingly, before arriving at the boarding/alighting point P, the vehicle X starts traveling toward the newly set boarding/alighting point Q'. After the vehicle Y arrives at the boarding/alighting point P, once the user B alights from the vehicle Y and the vehicle Y becomes an empty vehicle, the user A boards the vehicle Y. Then, the vehicle Y with the user A on board starts traveling toward the destination Q after the change.

As described above, in this embodiment, the vehicle dispatching system includes the first vehicle reserved by a user as a dispatch vehicle, the second vehicle that can be dispatched to a scheduled boarding point at which the user boards the dispatch vehicle, and the controller for communicating with communication devices in the first vehicle and the second vehicle and for managing a dispatch of the first vehicle or the second vehicle to the user. The controller is configured to acquire, before the user arrives at the scheduled boarding point, at least position information of the first vehicle and position information of the second vehicle, calculate the first scheduled arrival period until the first vehicle arrives at the scheduled boarding point based on the acquired position information of the first vehicle, calculate the first waiting period difference between the user scheduled arrival period until the user arrives at the scheduled boarding point and the first scheduled arrival period, calculate the second scheduled arrival period until the second vehicle arrives at the scheduled boarding point based on the acquired position information of the second vehicle, calculate the second waiting period difference between the user scheduled arrival period and the second scheduled arrival period, determine whether or not the second waiting period is shorter than the first waiting period, and when determining that the second waiting period is shorter than the first waiting period, designate the second vehicle as the dispatch vehicle. This allows shortening the waiting period of the dispatch vehicle or the user at the boarding point of the user.

In this embodiment, the controller sets the user scheduled arrival period based on the desired boarding time set by the user. This allows shortening the waiting period of the dispatch vehicle or the user relative to the desired boarding time of the user.

In this embodiment, the controller acquires position information of the user and calculates the user scheduled arrival period based on the position information of the user. This allows predicting the period until the user arrives at the scheduled boarding point from the current position of the user.

In this embodiment, the controller compares the second scheduled arrival time that is the scheduled time at which the second vehicle arrives at the scheduled boarding point with the user scheduled arrival time that is the scheduled time at which the user arrives at the scheduled boarding point, when the second scheduled arrival time is earlier than the user scheduled arrival time, determines whether or not the second waiting period is equal to or less than a predetermined allowable waiting period, and when determining that the second waiting period is not equal to or less than the predetermined allowable waiting period, prohibits designating the second vehicle as the dispatch vehicle. This allows the second vehicle to avoid waiting for the user for the predetermined period or more.

In this embodiment, the controller detects a plurality of vehicles located within a predetermined range from the scheduled boarding point of the user and detects the second vehicle from among the vehicles. This allows specifying a vehicle located close to the scheduled boarding point of the user as the second vehicle.

In this embodiment, when detecting a plurality of the second vehicles determined to have the second waiting period shorter than the first waiting period, the controller calculates the respective waiting period differences between the second waiting period of the plurality of the second vehicles and the first waiting period, compares a plurality of the calculated waiting period differences, and designates the second vehicle with a smaller waiting period difference as the dispatch vehicle in preference to the second vehicle with a larger waiting period difference. This allows dispatching the second vehicle with a shorter period difference between the waiting period between the user and the first vehicle and the waiting period between the user and the second vehicle to the user.

In this embodiment, when detecting a plurality of the second vehicles determined to have the second waiting period shorter than the first waiting period, the controller designates, as the dispatch vehicle, the second vehicle which arrives later than the user scheduled arrival time in preference to the second vehicle which arrives earlier than the user scheduled arrival time. This allows increasing usage efficiency of a boarding point because a user boards as soon as a vehicle arrives, and the vehicle does not wait for the user at the boarding point.

In this embodiment, when detecting a plurality of the second vehicles determined to have the second waiting period shorter than the first waiting period, the controller calculates respective traveling distances from current positions of the plurality of the second vehicles to the scheduled boarding point, compares a respectively plurality of the calculated traveling distances, and designates the second vehicle with a small traveling distance as the dispatch vehicle in preference to the second vehicle with a larger traveling distance. This allows dispatching the second vehicle with a smaller traveling distance among the plurality of the second vehicles to the user.

In this embodiment, the controller acquires information on the energy remaining amount of the second vehicle, calculates the energy necessary amount for the second vehicle to travel to a destination based on the position information of the destination set by the user, determines whether or not the energy remaining amount is smaller than the energy necessary amount, and when determining that the energy remaining amount is smaller than the energy necessary amount, prohibits designating the second vehicle as the dispatch vehicle. This allows avoiding a dispatch of the second vehicle, which lacks in the energy amount for traveling to the destination of the user, to the user.

In this embodiment, when designating the second vehicle as the dispatch vehicle for the user, the controller transmits to the terminal device of the user dispatch designation information that the second vehicle is designated as the dispatch vehicle for the user. This allows communicating to the user that the second vehicle is dispatched to the user.

Furthermore, in this embodiment, when designating the second vehicle as the dispatch vehicle for the user, the controller updates the vehicle information on the first vehicle to vehicle information indicating that the first vehicle can be dispatched to another user different from the user. This allows dispatching the first vehicle, which has been dispatched to the user, to another user.

Furthermore, in this embodiment, when designating the second vehicle as the dispatch vehicle for the user, the controller sets the dispatch plan set in the second vehicle to a dispatch plan of the first vehicle and sets the dispatch plan set in the first vehicle to a dispatch plan of the second vehicle. This allows reducing an empty vehicle period of the first vehicle that is substituted by the second vehicle and enhancing overall vehicle dispatch efficiency.

Furthermore, in this embodiment, when designating the second vehicle as the dispatch vehicle for the user, the controller dispatches the second vehicle to the user by controlling travel of the second vehicle. This allows dispatching the second vehicle that is designated as being dispatched to the user.

Second Embodiment

Figure 6:
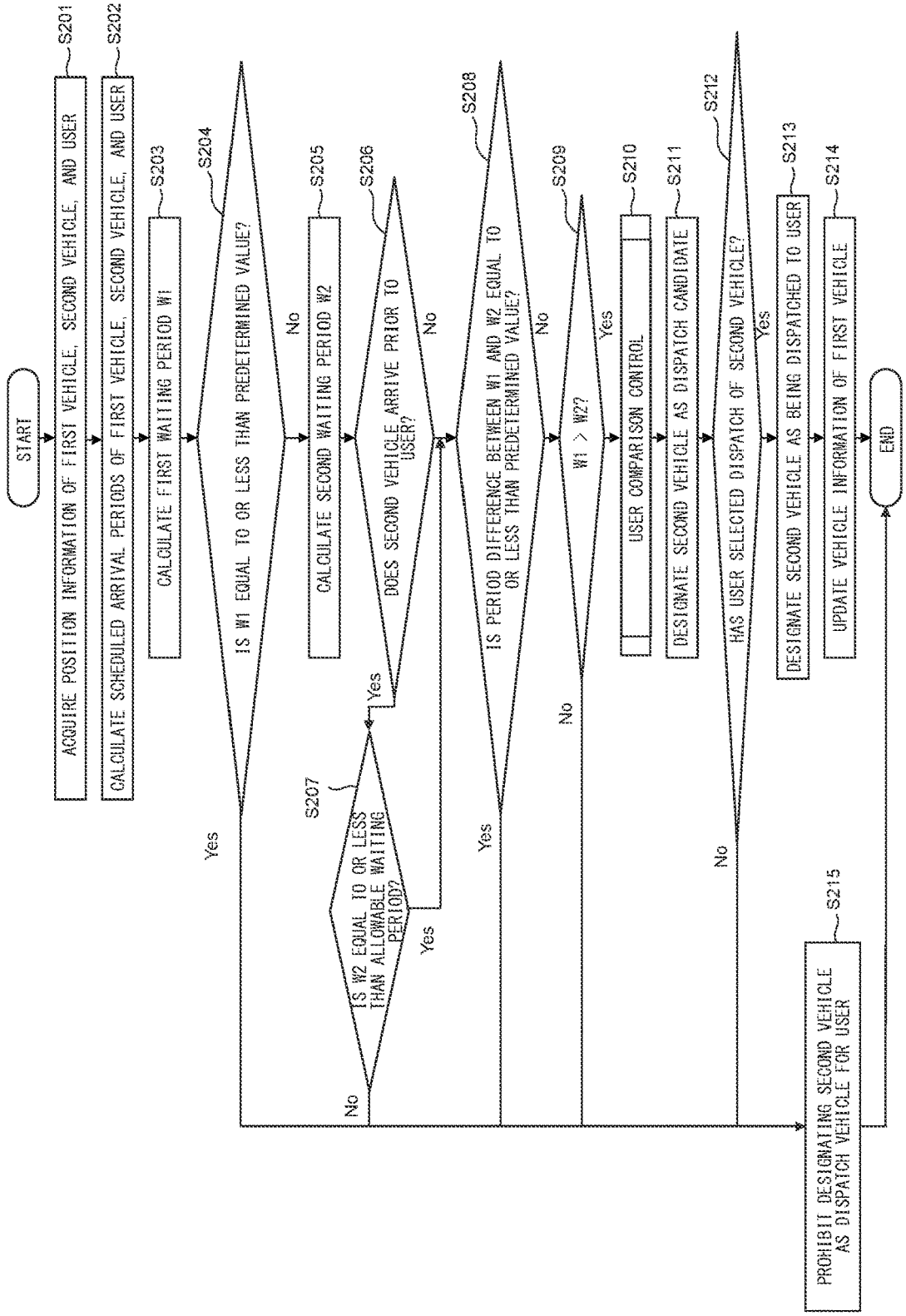
FIG. 6 is a flowchart illustrating a procedure of control for comparing dispatching the second vehicle to the user with dispatching the second vehicle to another user to execute dispatch designation.

The vehicle dispatching system 1 according to an embodiment is described. This embodiment is different from the first embodiment in a part of control of the vehicle dispatching device 10. The configuration of the vehicle dispatching system 1 is similar to that of the first embodiment, and the description is used. In the following description, while different parts among functions and control of the vehicle dispatching device 10 are mainly described, the functions and control of the vehicle dispatching device 10 described in the first embodiment are appropriately used. FIG. 6 is a flowchart illustrating a procedure of control according to this embodiment. As illustrated in FIG. 6, in the second embodiment, a control flow from Step S201 to Step S209 is similar to the control flow from Step S101 to Step S109 of the first embodiment, and a control flow from Step S211 to Step S215 is similar to the control flow from Step S110 to Step S114 of the first embodiment. That is, in the second embodiment, Step S210 is additionally executed as a process different from that in the first embodiment. Descriptions of the control flows similar to those in first embodiment are omitted.

Figure 7:
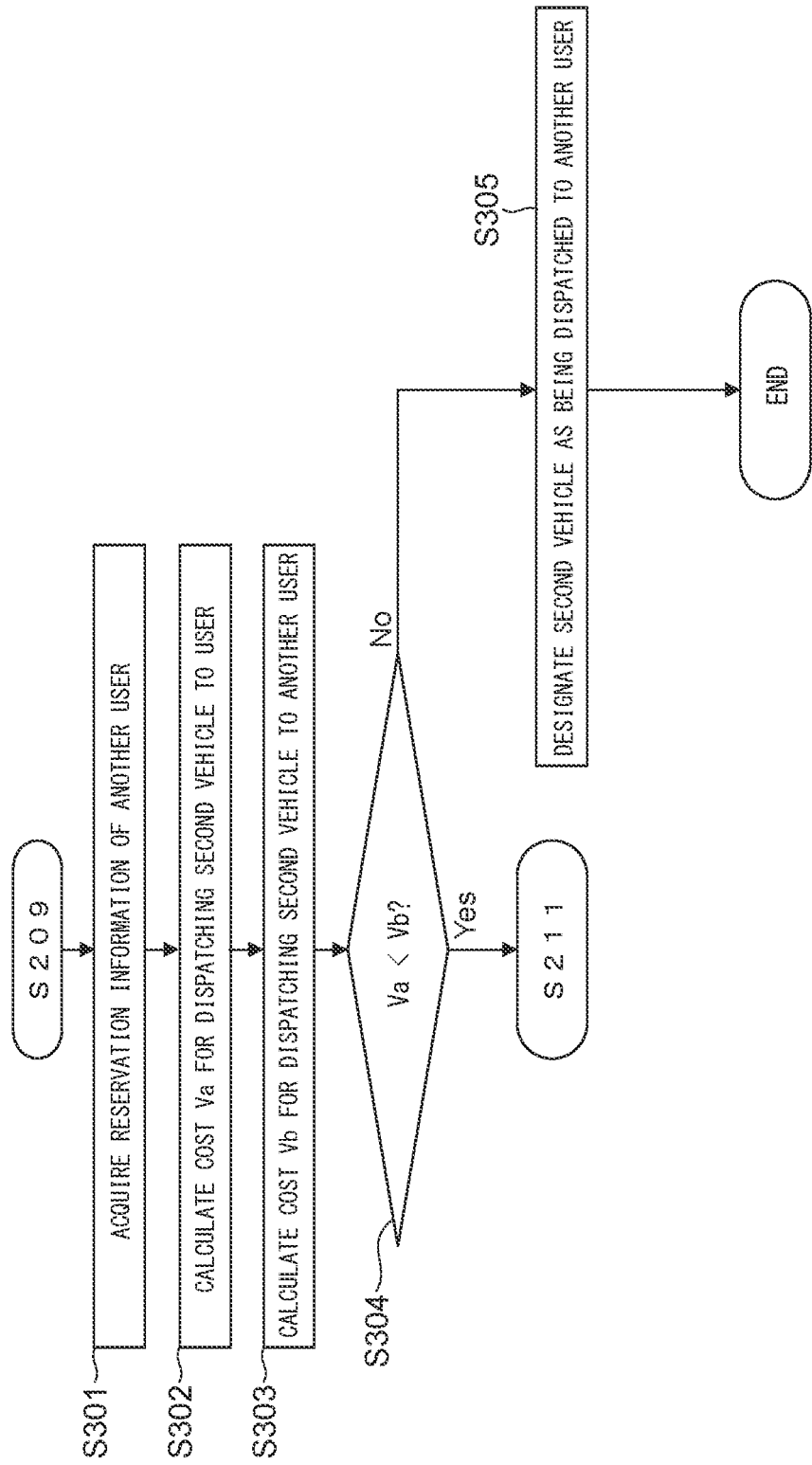
FIG. 7 is a flowchart illustrating a procedure of control for comparing dispatch costs.

In this embodiment, in Step S209, when the second waiting period W2 is determined to be shorter than the first waiting period W1, the procedure proceeds to Step S210. Then, in Step S210, user comparison control is executed to compare which of the user and another user dispatching the second vehicle to is advantageous when dispatch costs are compared. A procedure of the user comparison control is described using a flowchart of FIG. 7.

First, in Step S301, the dispatch designation unit 104 acquires reservation information of another user different from the user. For example, when the other user inputs and transmits the reservation information via the terminal device 30 and a request for using a dispatch vehicle from the other user is made, and when the vehicle 20 to be dispatched to the other user has not yet designated, the dispatch designation unit 104 acquires the reservation information of the other user. The reservation information includes at least current position information and destination information of the other user. When the reservation information of the other user is acquired, the procedure proceeds to Step S302.

In Step S302, the dispatch designation unit 104 calculates a dispatch cost Va for dispatching the second vehicle to the user. The dispatch cost is any cost required after the vehicle 20 is dispatched to the user until the vehicle 20 travels from the vehicle current position to the destination of the user, and in this embodiment, is a cost in which a period, a distance, and an energy consumption amount are quantified. For example, the dispatch designation unit 104 calculates the distance from the current position of the second vehicle to the destination position of the user from the position information of the second vehicle and the position information of the destination. The period required to travel the calculated distance may be calculated, or the energy consumption amount necessary to travel the calculated distance may be calculated. For the calculation of the dispatch cost, at least any of the period, the distance, and the energy amount should be included in the calculation.

In Step S303, the dispatch designation unit 104 calculates a dispatch cost Vb for dispatching the second vehicle to the other user. A calculation method is similar to that of the dispatch cost Va in Step S302.

In Step S304, the dispatch designation unit 104 compares Vb with Va and determines whether or not Vb is larger than Va. When Vb is determined to be larger than Va, the user comparison control ends, and the procedure returns to Step S211. When Vb is not determined to be larger than Va, the procedure proceeds to Step S305.

In Step S305, the dispatch designation unit 104 designates the second vehicle as the dispatch vehicle for the other user. Then, the designation of the first vehicle as the dispatch vehicle to the user is maintained.

As described above, in this embodiment, when acquiring the reservation information of the other user different from the user, the controller calculates the other user dispatch cost for dispatching the second vehicle to the other user and controlling the second vehicle to travel to the destination of the other user based on the position information of the destination set by the other user, calculates the user dispatch cost for dispatching the second vehicle to the user and controlling the second vehicle to travel to the destination of the user based on the position information of the destination set by the user, compares the user dispatch cost with the other user dispatch cost, and when the user dispatch cost is higher than the other user dispatch cost, prohibits designating the second vehicle as the dispatch vehicle for the user. Accordingly, when dispatching the second vehicle to the other user is more advantageous than dispatching the second vehicle to the user when the dispatch costs are compared, dispatching the second vehicle to the user can be avoided.

The embodiments described above are described for facilitating understanding of the present invention, and are not described for limiting the present invention. Therefore, each element disclosed in the above embodiments is intended to include all design changes and equivalents belonging to the technical scope of the present invention.

DESCRIPTION OF REFERENCE NUMERALS

1 Vehicle dispatching system
10 Vehicle dispatching device
Controller 100
101 Vehicle information acquisition unit
102 User information acquisition unit
103 Arrival period prediction unit
104 Dispatch designation unit
105 Dispatch planning unit
106 Communication device
107 Storage device
20 Vehicle
200 Control device
203 On-board communication device
30 Terminal device
301 Input unit
303 Terminal communication device
304 User information reception unit
305 Output unit
40 Network

The invention claimed is:

1. A vehicle dispatching system comprising:
a first vehicle reserved by a user as a dispatch vehicle;
a second vehicle that can be dispatched to a scheduled boarding point at which the user boards the dispatch vehicle; and
a controller for communicating with communication devices in the first vehicle and the second vehicle and for managing a dispatch of the first vehicle or the second vehicle to the user,
the controller configured to:
acquire, before the user arrives at the scheduled boarding point, position information of the first vehicle and position information of the second vehicle;
calculate a first scheduled arrival period until the first vehicle arrives at the scheduled boarding point based on the acquired position information of the first vehicle;
calculate a first waiting period difference between a user scheduled arrival period until the user arrives at the scheduled boarding point and the first scheduled arrival period;
calculate a second scheduled arrival period until the second vehicle arrives at the scheduled boarding point based on the acquired position information of the second vehicle;

calculate a second waiting period difference between the user scheduled arrival period and the second scheduled arrival period;

determine whether or not a period difference between the first waiting period and the second waiting period is equal to or less than a predetermined value;

determine whether or not the second waiting period is shorter than the first waiting period;

when determining that the period difference between the first waiting period and the second waiting period is not equal to or less than the predetermined value and the second waiting period is shorter than the first waiting period, designate the second vehicle as the dispatch vehicle;

when determining that the period difference between the first waiting period and the second waiting period is equal to or less than the predetermined value and the second waiting period is shorter than the first waiting period, prohibit designating the second vehicle as the dispatch vehicle; and transmit information on a traveling route including the scheduled boarding point to the second vehicle designated as being dispatched, wherein the second vehicle is configured to:

acquire information on a traveling environment around the second vehicle by at least one of a sensor and a GPS in the second vehicle; and automatically control the second vehicle to travel along a traveling path generated based on the information on the traveling route and the information on the traveling environment.

2. The vehicle dispatching system according to claim 1, the controller being further configured to set the user scheduled arrival period based on a desired boarding time set by the user.

3. The vehicle dispatching system according to claim 1, the controller being further configured to:

acquire position information of the user; and calculate the user scheduled arrival period based on the position information of the user.

4. The vehicle dispatching system according to claim 1, the controller being further configured to:

compare a second scheduled arrival time with a user scheduled arrival time, the second scheduled arrival time being a scheduled time at which the second vehicle arrives at the scheduled boarding point and the user scheduled arrival time being a scheduled time at which the user arrives at the scheduled boarding point;

when the second scheduled arrival time is earlier than the user scheduled arrival time, determine whether or not the second waiting period is equal to or less than a predetermined allowable waiting period; and when determining that the second waiting period is not equal to or less than the predetermined allowable waiting period, prohibit designating the second vehicle as the dispatch vehicle.

5. The vehicle dispatching system according to claim 1, the controller being further configured to:

detect a plurality of vehicles located within a predetermined range from the scheduled boarding point, and detect, the second vehicle from among a plurality of the vehicles.

6. The vehicle dispatching system according to claim 1, the controller being further configured to:

when detecting a plurality of the second vehicles determined to have the second waiting period shorter than the first waiting period, respectively calculate waiting period differences between the second waiting period of the plurality of the second vehicles and the first waiting period;

compare a plurality of the calculated waiting period differences; and designate the second vehicle with a smaller waiting period difference as the dispatch vehicle in preference to the second vehicle with a larger waiting period difference.

7. The vehicle dispatching system according to claim 1, the controller being further configured to:

when detecting a plurality of the second vehicles determined to have the second waiting period shorter than the first waiting period, designate, as the dispatch vehicle, the second vehicle which arrives at the scheduled boarding point later than a user scheduled arrival time in which the user is scheduled to arrive at the scheduled boarding point in preference to the second vehicle which arrives at the scheduled boarding point earlier than the user scheduled arrival time.

8. The vehicle dispatching system according to claim 1, the controller being further configured to:

when detecting a plurality of the second vehicles determined to have the second waiting period shorter than the first waiting period, respectively calculate traveling distances from current positions of a plurality of the second vehicles to the scheduled boarding point, compare a plurality of the calculated traveling distances respectively, and designate the second vehicle with a small traveling distance as the dispatch vehicle in preference to the second vehicle with a larger traveling distance.

9. The vehicle dispatching system according to claim 1, the controller being further configured to:

acquire information on an energy remaining amount of the second vehicle;

calculate an energy necessary amount for the second vehicle to travel to a destination based on position information of the destination set by the user;

determine whether or not the energy remaining amount is smaller than the energy necessary amount; and when determining that the energy remaining amount is smaller than the energy necessary amount, prohibit designating the second vehicle as the dispatch vehicle.

10. The vehicle dispatching system according to claim 1, the controller being further configured to:

when acquiring reservation information of an other user different from the user, calculate an other user dispatch cost for dispatching the second vehicle to the other user and controlling the second vehicle to travel to a destination of the other user based on position information of the destination set by the other user;

calculate user dispatch cost for dispatching the second vehicle to the user and controlling the second vehicle to travel to a destination of the user based on position information of the destination set by the user;

compare the user dispatch cost with the other user dispatch cost; and when the user dispatch cost is higher than the other user dispatch cost, prohibit designating the second vehicle as the dispatch vehicle for the user.

11. The vehicle dispatching system according to claim 1, the controller being further configured to:

when designating the second vehicle as the dispatch vehicle for the user, transmit to a terminal device of the user dispatch designation information that the second vehicle is designated as the dispatch vehicle for the user.

12. The vehicle dispatching system according to claim 1, the controller being further configured to:
when designating the second vehicle as the dispatch vehicle for the user, update vehicle information on the first vehicle to vehicle information indicating that the first vehicle can be dispatched to another user different from the user.

13. The vehicle dispatching system according to claim 1, the controller being further configured to:
when designating the second vehicle as the dispatch vehicle for the user, set a dispatch plan set in the second vehicle to a dispatch plan of the first vehicle, and set a dispatch plan set in the first vehicle to a dispatch plan of the second vehicle.

14. The vehicle dispatching system according to claim 1, the controller being further configured to:
when designating the second vehicle as the dispatch vehicle for the user, dispatch the second vehicle to the user by controlling travel of the second vehicle.

15. A vehicle dispatching method for managing a dispatch to a user of a first vehicle reserved by a user as a dispatch vehicle or a second vehicle that can be dispatched to a scheduled boarding point in which the user boards the dispatch vehicle, using a controller for communicating with communication devices in the first vehicle and the second vehicle, the vehicle dispatching method comprising:
acquiring, before the user arrives at the scheduled boarding point, position information of the first vehicle and position information of the second vehicle;
calculating a first scheduled arrival period until the first vehicle arrives at the scheduled boarding point based on the acquired position information of the first vehicle;
calculating a first waiting period difference between a user scheduled arrival period until the user arrives at the scheduled boarding point and the first scheduled arrival period;
calculating a second scheduled arrival period until the second vehicle arrives at the scheduled boarding point for the user based on the acquired position information of the second vehicle;
calculating a second waiting period difference between the user scheduled arrival period and the second scheduled arrival period;
determining whether or not a period difference between the first waiting period and the second waiting period is equal to or less than a predetermined value;
determining whether or not the second waiting period is shorter than the first waiting period;
when determining that the period difference between the first waiting period and the second waiting period is not equal to or less than the predetermined value and the second waiting period is shorter than the first waiting period, designating the second vehicle as the dispatch vehicle;
when determining that the period difference between the first waiting period and the second waiting period is equal to or less than the predetermined value and the second waiting period is shorter than the first waiting period, prohibiting designating the second vehicle as the dispatch vehicle;
transmitting information on a traveling route including the scheduled boarding point to the second vehicle designated as being dispatched;

acquiring, by at least one of a sensor and a GPS in the second vehicle, information on a traveling environment around the second vehicle; and
automatically controlling the second vehicle to travel along a traveling path generated based on the information on the traveling route and the information on the traveling environment.

16. A vehicle dispatching device comprising a controller for communicating with communication devices in a first vehicle reserved by a user as a dispatch vehicle and a second vehicle that can be dispatched to a scheduled boarding point in which the user boards the dispatch vehicle and for managing a dispatch of the first vehicle or the second vehicle to the user, the controller comprising:
a vehicle information acquisition unit acquiring, before the user arrives at the scheduled boarding point, position information of the first vehicle and position information of the second vehicle;
a first arrive period calculation unit calculating a first scheduled arrival period until the first vehicle arrives at the scheduled boarding point based on the acquired position information of the first vehicle;
a first wait period calculation unit calculating a first waiting period difference between a user scheduled arrival period until the user arrives at the scheduled boarding point and the first scheduled arrival period;
a second arrival period calculation unit calculating a second scheduled arrival period until the second vehicle arrives at the scheduled boarding point based on the acquired position information of the second vehicle;
a second waiting period calculation unit calculating a second waiting period difference between the user scheduled arrival period and the second scheduled arrival period;
determination unit determining whether or not a period difference between the first waiting period and the second waiting period is equal to or less than a predetermined value and whether or not the second waiting period is shorter than the first waiting period;
dispatch designation unit designating the second vehicle as the dispatch vehicle when determining that the period difference between the first waiting period and the second waiting period is not equal to or less than the predetermined value and the second waiting period is shorter than the first waiting period and prohibiting designating the second vehicle as the dispatch vehicle when determining that the period difference between the first waiting period and the second waiting period is equal to or less than the predetermined value and the second waiting period is shorter than the first waiting period; and
dispatch planning unit transmitting information on a traveling route including the scheduled boarding point to the second vehicle designated as being dispatched,
wherein the second vehicle is automatically controlled to travel along a traveling path generated based on the information on the traveling route transmitted from the controller and an information on a traveling environment around the second vehicle, acquired by at least one of a sensor and a GPS in the second vehicle.

\* \* \* \* \*